Oct. 27, 1936.                H. YSSKIN                 2,058,754
STARTING DEVICE
Filed July 31, 1935
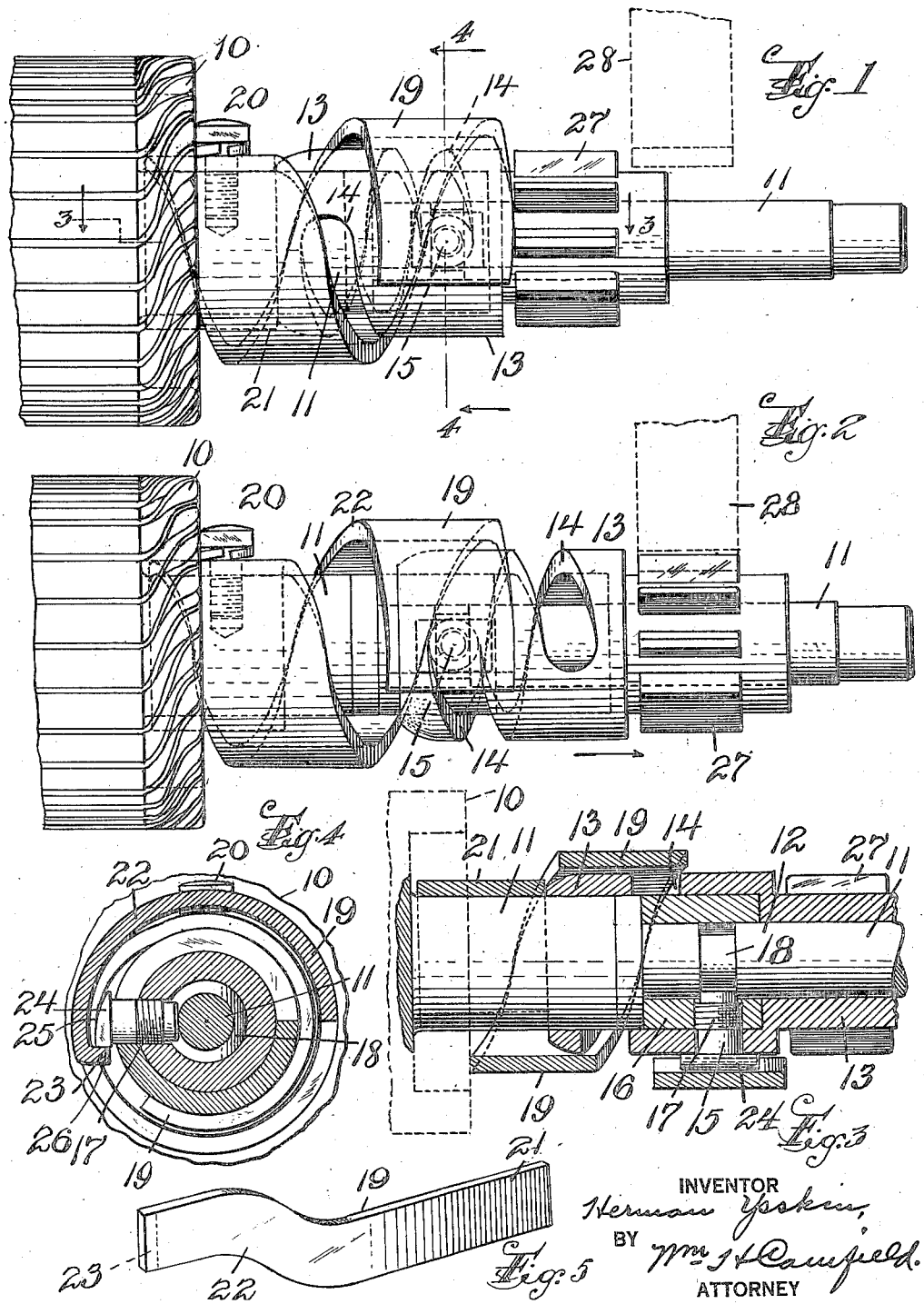

Patented Oct. 27, 1936

2,058,754

UNITED STATES PATENT OFFICE 2,058,754

STARTING DEVICE

Herman Ysskin, Newark, N. J.

Application July 31, 1935, Serial No. 33,933

5 Claims. (Cl. 74—9)

This invention relates to an improved starting device for internal combustion engines. The starting device is of the type that moves a pinion longitudinally to engage a gear of the engine and rotates the pinion, and having means to disconnect the pinion under excess strain on a spring utilized in actuating the pinion.

The object of the invention is to provide a compact device that is effective at an early stage of the operation of the motor thus accomplishing a quick and positive starting of the engine.

Another object of the invention is to provide a starter in which all the parts are readily accessible for inspection and repair and in which parts can be replaced if damaged with little loss of time and without the taking down of many parts which is the case in the starting device now in use.

The invention also resides in certain details of construction which are more fully described hereinafter and finally embodied in the claims.

The invention is illustrated in the accompanying drawing. Figure 1 is a side view of a starting device embodying my invention showing the parts in normal or inoperative position. Figure 2 is a view similar to Figure 1 with the parts operated to force a pinion into engagement with the engine. Figure 3 is a detail section on line 3—3 in Figure 1. Figure 4 is a cross-section on line 4—4 in Figure 1. Figure 5 is a perspective view of a blank from which the helical spring is made.

In the drawing 10 is the armature of the motor from which the shaft 11 projects. The armature rotates the shaft when the motor is energized. The shaft has a part 12 reduced in diameter. The shaft 11 supports a sleeve 13 which is arranged to both rotate on the shaft and to travel longitudinally on the shaft, the compound movement being due, in the form shown to a helical slot 14 and a pin 15 which projects into the slot. The pin 15 is not fixed for rotation with the shaft but is held against movement longitudinally of the shaft. The construction illustrated embodies a collar 16 which has a screw-threaded hole into which the screw-threaded part 17 of the pin is screwed. The end of the pin projects into an annular groove 18 in the shaft to prevent longitudinal movement of the pin relative to the shaft but not to rotate the pin with the shaft by their direct connection. The rotation of the pin 15 is carried by a helical spring 19. The helical spring is secured to the shaft and projects over the sleeve 13 to engage the head of the pin 15.

The helical spring is shown secured by a screw 20 and the preferred form of spring is that shown as a blank in Figure 5. This form has the straight part 21 which is long enough to encircle the major circumference of the shaft to insure a firm and broad contact which is done to prevent tilting and hold the projecting part of the spring in place against undue tilting or twisting. The blank has the inclined part 22 which is curled around to form a housing for the sleeve, as shown in Figure 1. The free end of the spring 19 is formed into a lip or hook 23 which engages the end of the pin 15 beyond the sleeve. The pin 15 is actuated solely by the spring 19 and the head 24 of the pin 15 is preferably inclined on its top face as at 25 to form the broad end 26 for engagement by the lip or hook 23. The inclined face rides under the lip 23 when the direction of rotation of the parts is reversed.

The sleeve 13 is provided at its outer end with a pinion 27, usually made integral with the sleeve 13 and designed to mesh with the gear 28 connected to the engine and supplying the means for rotating the engine from the starter. It will be evident that the spring encircling or partly encircling the sleeve forms a housing for the sleeve, thus making it possible to compact the whole structure in a small space and thus also minimizing strains on the parts. The sleeve is provided with the groove 14 extending usually no more than one revolution around its circumference whereby the pinion 27 is quickly thrown into mesh with the gear 28.

The operation of the device is as follows:—

On energizing the motor of the starter, the armature 10 and shaft 11 are rotated carrying the spring 19 with the shaft. The spring in turn, by its hook or lip 23, carries the pin 15 around with it. This quick start causes the pin in the helical slot 14 to move the sleeve longitudinally on the shaft until the pin 15 reaches the inner end of the slot 14 and the pinion 27 is in mesh with the gear 28. The parts now all revolve together and the engine is started.

In case of excess strain on the spring 19 the lip 23 disengages from the head 24 of the pin 15 and the spring is not broken. The spring, of course, engages the pin 15 on the next rotation of the shaft and spring.

After the engine is started the circuit of the starting motor is broken and the armature 10 comes to rest. The rotation of the gear 28 is transmitted to the pinion 27 and sleeve 13. The rotation causes the pinion 27 and sleeve 13 to move longitudinally along the shaft 11 toward the armature 10 and the longitudinal movement is limited by the pin 15 in the slot 14. The device is then in the position shown in Figure 1 with the pinion out of mesh with the ring gear 28 and remains in this position till the starting motor circuit is again closed.

Various changes can be made in the proportion and form of the parts without departing from the scope of my invention.

I claim:—

1. A starting device comprising a rotatable shaft, a sleeve rotatable and movable longitudinally on the shaft, a pinion on the sleeve, the sleeve having a helical slot for controlling and limiting the aforesaid movement of the sleeve on the shaft, a pin on the shaft and extending through and beyond the slot in the sleeve, and a spring movable with the shaft and forming a housing for the sleeve, the spring having its end formed to hook over the end of the pin when the shaft rotates.

2. A starting device comprising a shaft, a helical flat spring secured to rotate with the shaft and with its free end formed into a hook, a sleeve slidable on the shaft and having a helical slot, a pin secured to the shaft and projecting through the slot with its free end in the rotative path of the hook and a member on the sleeve for driving an engine member.

3. A starting device comprising a shaft, a helical flat spring secured to rotate with the shaft and with its free end formed into a hook, a sleeve slidable on the shaft and having a helical slot, a pinion on the sleeve, a pin secured to the shaft and projecting through the slot with its free end in the rotative path of the hook, the said free end having a head with an inclined top, the widest edge being in contact with the hook part whereby the inclined top acts as an entering cam when the pin travels against the hook in reverse direction.

4. A starting device comprising a shaft, a sleeve rotatable and movable longitudinally on the shaft, an engine engaging member on the sleeve, means for limiting and controlling the said movement of the sleeve, said means including a pin secured to the shaft against movement longitudinal to the shaft, and a helical spring secured to the shaft and projecting to form a housing into which the sleeve can retreat and having its end formed into a hook bearing on the free end of the pin when the shaft rotates.

5. A starting device comprising a shaft, a flat helical spring secured to the shaft and projecting to form a housing spaced from the shaft, the end of the spring being formed into a hook, a sleeve having an engine driving member on its outer end, the sleeve being adapted to be normally inside the housing and having a helical slot therein, and a pin secured to the shaft and projecting through the slot and with its end engaged by the hook when the shaft is rotated, the pin thus acting to transmit power from the spring and to advance the sleeve longitudinally by engagement with the slot.

HERMAN YSSKIN.